April 17, 1928.  1,666,126
F. G. FOLBERTH ET AL
AUTOMATIC WINDSHIELD CLEANER
Filed Oct. 3, 1923  2 Sheets-Sheet 1
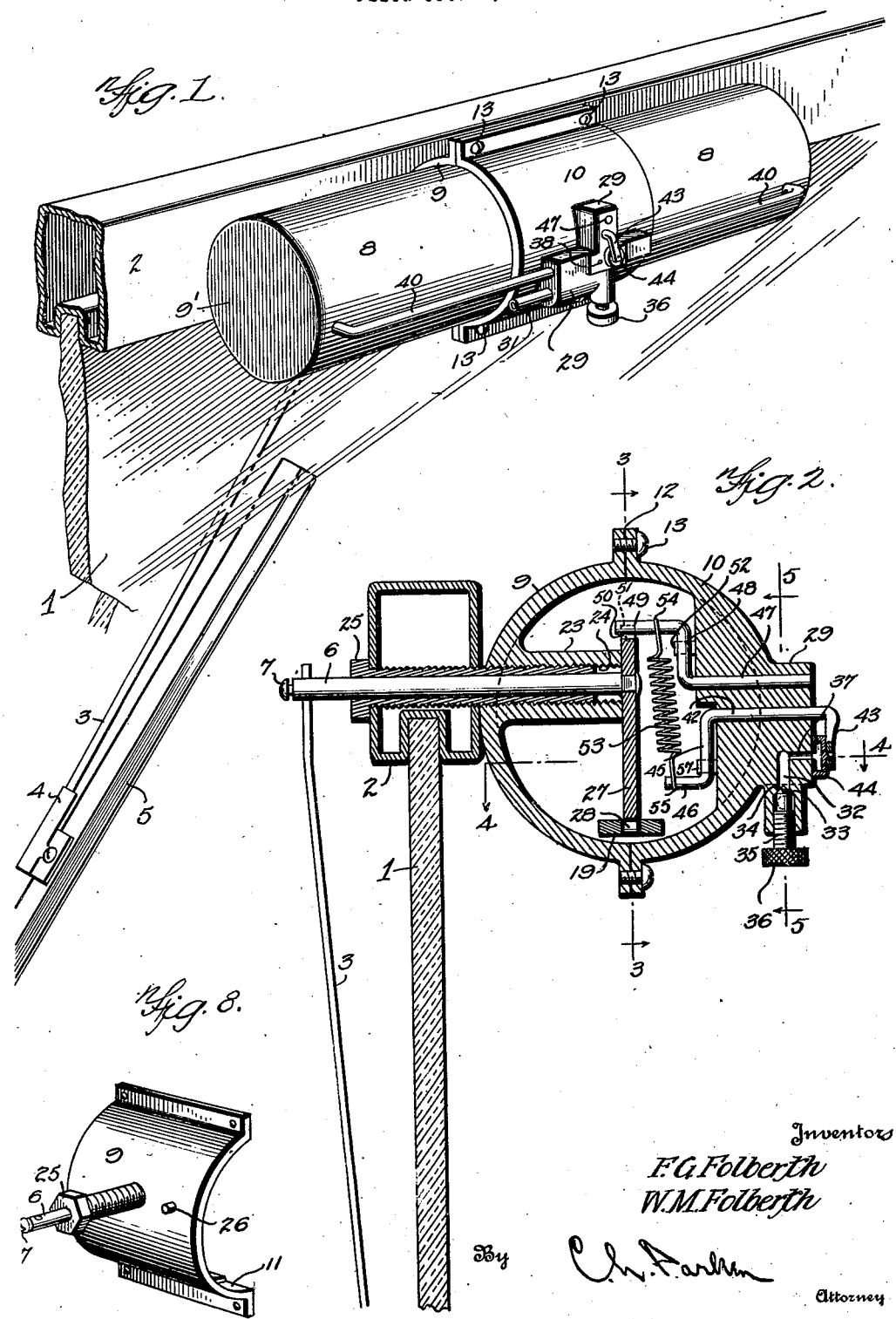

April 17, 1928.
F. G. FOLBERTH ET AL
1,666,126
AUTOMATIC WINDSHIELD CLEANER
Filed Oct. 3, 1923  2 Sheets-Sheet 2
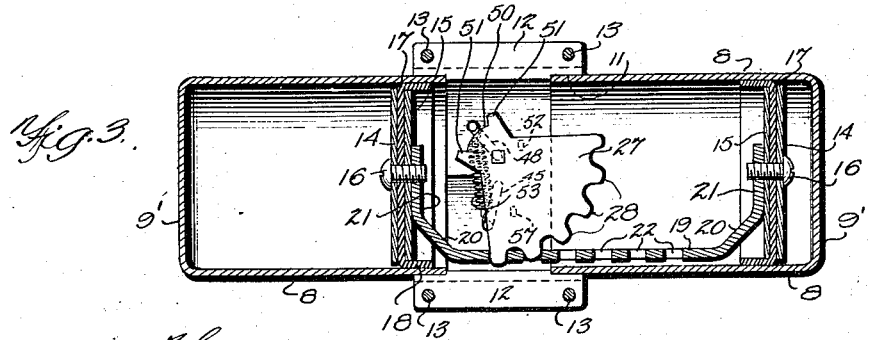
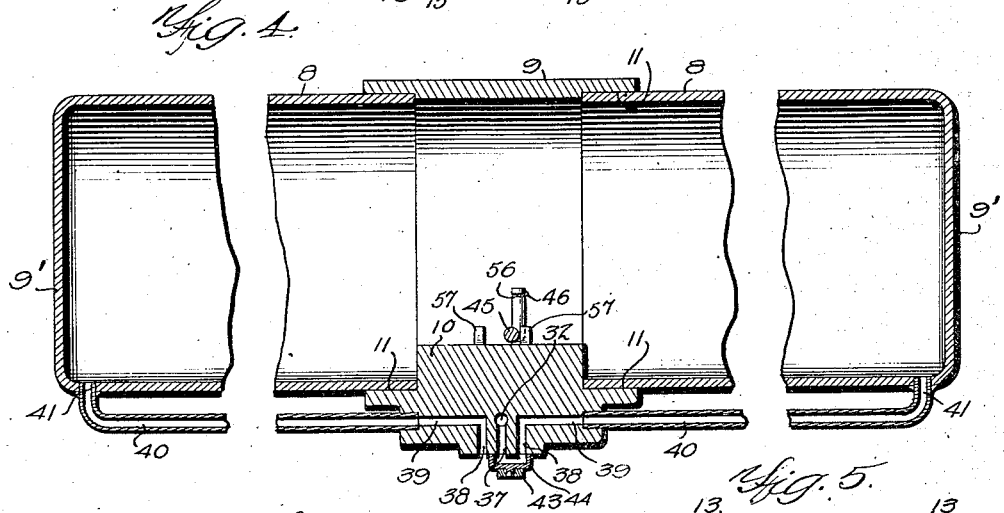
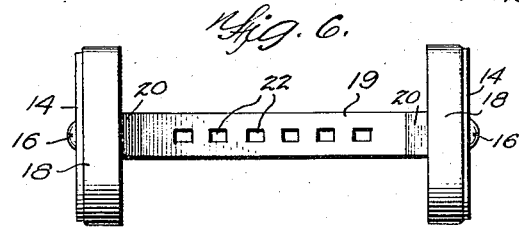
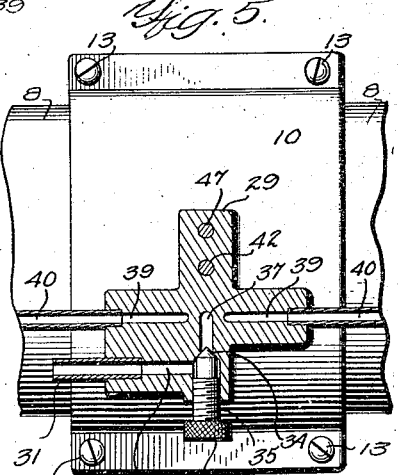
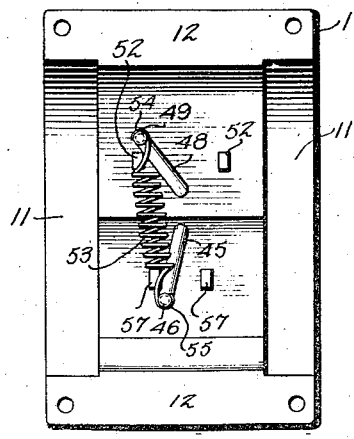
Inventors
F. G. Folberth
W. M. Folberth
By
Attorney Patented Apr. 17, 1928.

1,666,126

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

AUTOMATIC WINDSHIELD CLEANER.

Application filed October 3, 1923. Serial No. 666,367.

This invention relates to automatic windshield cleaners of the type described and claimed in a prior patent to William M. Folberth, granted February 7, 1922, No. 1,405,773, wherein a cleaner element is driven by an automatic suction motor arranged adjacent the windshield to be cleaned, and the motor is connected to the intake manifold to be operated by the suction of the manifold.

An object of the invention is the provision of a cleaner motor of relatively simple construction which may be manufactured at low cost.

A further object of the invention is to provide a simple and efficient "snap over" valve mechanism whereby the opposite ends of the cylinder motor are alternately connected to the source of suction.

A further object is the provision of improved means for securing the motor of the windshield cleaner to the frame of the windshield.

In the accompanying drawings, we have shown one embodiment of the invention. In this showing:

Figure 1 is a perspective view of a portion of a windshield and windshield frame showing the invention applied, Figure 2 is a central vertical sectional view, Figure 3 is a vertical sectional view on line 3—3 of Figure 2, Figure 4 is a horizontal sectional view on line 4—4 of Figure 2, Figure 5 is a detail sectional view on line 5—5 of Figure 2, Figure 6 is a plan view of the pistons and connecting member, Figure 7 is a rear elevation of a semi-cylindrical casting showing a portion of the valve operating mechanism, and, Figure 8 is a perspective view of a similar casting showing the arrangement of the cleaner shaft.

Referring to the drawings, the reference numeral 1 designates generally a windshield or other transparent window to be cleaned. The windshield is mounted in a frame 2 in the usual manner, which frame is formed of metal. A cleaner arm 3 is arranged exteriorly of the windshield and is provided with retaining means 4 adapted to receive a wiper or cleaner element 5 adapted to contact with the windshield to be cleaned. The upper end of the cleaner arm passes through an opening in a cleaner shaft 6 and is retained in position by means of a suitable fastening element 7. The shaft passes through the windshield frame and extends into a motor casing arranged on the opposite side of the frame within the vehicle. As shown, the motor casing consists of two cylindrical members 8 having their outer ends closed, as at 9'. These cylindrical members may be formed of any suitable material but are preferably formed of metal and stamped out. The inner open ends of the cylindrical members are connected by a pair of semi-cylindrical castings 9 and 10. As shown, these castings are provided with recesses 11 at each end, adapted to receive the respective ends of the cylindrical members 8 and are further provided with upper and lower flanges 12, adapted to receive screws or bolts 13 to secure them to each other and hold the cylindrical members in position.

A piston couple comprising a pair of spaced pistons connected by a rack member is mounted within the casing and each piston is adapted to reciprocate within one of the cylindrical members. As shown, each piston comprises a pair of disks 14 and 15, preferably formed of metal and slightly smaller in diameter than the inner diameter of the cylinders 8. These disks are connected by means of a bolt or screw 16 which passes through a sheet 17 of rubber or other suitable packing. As shown, the rubber sheet is larger than the diameter of the cylinder and is adapted to form a flange 18 to prevent leakage of air or other fluid around the piston. The pistons are connected by means of a web 19 which is preferably formed of metal and stamped to provide inclined portions 20 adjacent each end and upright end portions 21. The screws 16 are received in openings in the end portions 21 of the web to secure the pistons to the web. The web is provided with a plurality of spaced openings 22, which may be formed in the stamping operation and which form a part of the means for transmitting the movement of the pistons to the shaft 6.

The casting 9 is provided with an inwardly extending boss 23 which is internally screw-threaded, as at 24. This boss is adapted to receive a bolt 25 passing through the opening in the windshield frame and surrounding the shaft. The motor casing is assembled on the frame of the windshield by tightening the bolt 25 and the bolt serves as the sole support and bearing for the cleaner shaft 6. The casting may be further provided with projecting lugs or pins 26 on its outer face adapted to be received in openings in the windshield frame to assist in maintaining the motor casing in position. A plate 27 is secured to the inner end of the cleaner shaft and this plate is provided with an arcuate edge having teeth 28 formed thereon, providing a segmental gear adapted to mesh with the openings in the web 19. It will thus be seen that the reciprocation of the pistons in the cylinder or casing oscillates the plate 27 and thus oscillates the cleaner shaft to move the cleaner element over the exterior of the windshield.

Suitable automatic valve mechanism is provided to connect the opposite ends of the cylinder to a source of suction. As shown, the casting 10 is provided with an enlargement 29 on its exterior and this enlargement is bored through one end to provide a passage 30. A tube 31 is arranged in this passage and this tube is adapted to receive a rubber hose or other flexible conduit (not shown) by means of which the passage is connected to the intake manifold of an internal combustion engine, or other suction producing means (not shown). A passage 32 is connected to the inner end of the passage 31 and extends upwardly. The end of this passage is provided with a valve seat 33 adapted to be engaged by a valve 34, formed on the end of a threaded stem 35. The threads of the valve stem engage internal threads in an enlargement on the lower end of the passage 32. The outer end of the valve stem is provided with an operating handle 36. The upper end of the passage 32 communicates with a passage 37 extending to the outer face of the enlargement 29. A passage 38 is arranged on each side of the passage 37 and these passages extend inwardly and communicate with longitudinally extending passages 39. The ends of the passages 39 are adapted to receive tubes 40 which extend longitudinally of the motor casing and are provided with offset ends 41, extending through the cylinder casing and communicating with the interior. In assembling the motor casing the cup-shaped cylinders or cylindrical members 8 are slid axially into their concaved seats or recesses 11 and by the same movement the inner ends of the tubes 40 are slid into the adjacent ends of passages 39 where they are held securely by the clamping section 9 and its screws 13.

An arm 42 extends through the casting 10 and the enlargement 29 above these passages and the outer end of the arm is extended downwardly as at 43, and carries a cup-shaped valve 44 on its lower end. The valve is adapted to oscillate over the exterior of the enlargement 29 and establish communication between the passage 37 and one of the passages 38, as shown in Figure 4 of the drawings. The inner end of the arm 42 is extended downwardly within the cylinder, as at 45, and is provided with an offset portion 46. A second arm 47 is arranged in an opening extending through the casting 10 and the enlargement 29 and this arm is provided with an extension 48 within the cylinder extending upwardly. The end of the arm 47 is offset, as at 49, and arranged over the offset end 46 of the arm 42. This offset end 49 extends over the plate 27 and the plate is provided with an arcuate portion 50, to permit the plate to oscillate without engaging the arm. An upwardly extending lug 51 is arranged at each end of the arcuate portion and is adapted to engage the offset 49 to swing the arm on its pivot. The inner face of the casting 10 is provided with a pair of lugs 52, adapted to engage the extended portion 48 of the arm to limit its movement. A coil spring 53 is arranged between the offset ends 46 and 49 of the arms, the upper end 54 of the spring being arranged over the offset 49 and the lower end 55 being arranged over the offset 46 of the lower arm. In order to exert an inward force on the arm 42 and retain the valve 44 in engagement with the face of the enlargement 29 and in order to exert an outward pull on the arm 47, the arms are provided with grooves 56, arranged out of alinement with each other, whereby the spring 53 is normally disposed at an angle to the vertical, as shown in Figure 2 of the drawings. The inner face of the casting 10 is provided with stops 57 similar to the stops 52 but arranged in the path of the extension 45 on the arm 42 to limit the movement of the arm 42 and cause the valve 44 to assume positions establishing communication between the central passage 37 and the side passages 38 alternately.

In operation, the device is installed or assembled by forming an opening in the windshield frame for the reception of the hollow bolt 25. The inner side of the windshield frame is also provided with openings (not shown) for the reception of the lugs 26. The bolt 25 is slid over the shaft 6 through the opening in the windshield frame and tightened in the bore of the boss 23. It thus forms a securing means for the motor casing and a bearing for the shaft. The tube 31 is connected to a source of suction, such as the vacuum tank of a vacuum feed gasoline system or directly to the intake manifold of the engine, establishing communication between the passages 30, 32 and 37, and the desired source of suction. In Figure 3 of the drawings, the pistons are shown at the limit of their movement toward the right end of the cylinder and the right lug 51 has just engaged and moved the end 49 of the arm 47 to shift the valves. The valve 44 is thereby moved from the position shown in Figure 4 of the drawings, to the left, establishing communication between the suction passage 37 and the passage 38 to the left. This creates a differential pressure in the cylinder, exhausting the air from the left end while the right end is in communication with the atmosphere through the passages 38 and 39 and tube 40. As the pistons move, the segmental plate oscillates about the shaft 6 as a center, due to the engagement of the teeth 28 with the arc formed by the openings 22 in the bar 19. As the piston reaches its limit of movement, the lug 51 engages the end of the arm 47 and swings this arm on its pivot. The movement of the arm is limited by the stop 52. As the end of the arm swings around the main portion of the arm as a center in an arc of a circle, the spring 53 is placed under tension, and as soon as the spring passes the point where its center line is on the opposite side of the center of arm 42, the pull is exerted on the end of arm 42 and in an opposite direction to swing this arm and shift the valve to the position shown in Figure 4 of the drawings. The movement of the arm 42 is limited by the stops 57 and cause the valve to assume its proper position to establish communication between the passage 37 and either of the passages 38. As stated, the spring 53 is arranged in an angular position to exert an inward pull on the arm 42 and retain the valve 44 in snug engagement with the face of the enlargement 29. The upper end of the spring exerts an outward pull on the arm 47 and prevents displacement of this arm.

The cylinder construction and the mounting therefor have been made a part of divisional application Serial No. 127,005, filed August 4, 1926.

It is to be understood that the form of our invention herewith shown and described is to be taken as a preferred example of the same and that various changes in the shape, size, and arrangement of parts may be resorted to without departing from the spirit of the invention or the scope of the subjoined claims.

Having thus described the invention, we claim:

1. Valve actuating mechanism for windshield cleaner motors comprising a motor casing having an exteriorly arranged valve seat, said valve seat having fluid passages communicating with the ends of the casing and a suction passage interposed between said passages, a valve movable on the seat to connect the suction passage alternately with each fluid passage, an arm journaled in said casing and connected to the valve for shifting the same on its seat, the inner end of said arm being extended toward said rack member, a second arm journaled in the casing and extending away from the rack member within the casing, said second arm having a lateral extension operable by and during movement of a moving part of the motor, and a spring connecting the two arms together for moving the first arm to effect a shifting of the valve following a preliminary movement of the second arm by either lug of said segmental gear.

2. Valve actuating mechanism for windshield cleaners, comprising a cylinder member provided with passages connected to opposite ends of said cylinder, and a passage adapted to be connected to a source of suction, a valve member movable to cover said suction passage and either of said other passages, an arm connected to said valve member and extending through said cylinder member to permit said arm to oscillate about its own axis, said arm being extended downwardly and inwardly, a second arm mounted in said member above said first arm and extending into said cylinder, said arm being extended upwardly and inwardly for being engaged by a movable part of said motor to swing said arm about its own axis, and a spring connecting the inwardly extending portions of said arms.

3. Valve actuating mechanism comprising a pair of arms mounted in a cylinder wall to oscillate on their own axes, a valve carried by one of said arms, said arms being extended within the cylinder in opposite directions and provided with offset ends extending transversely of the cylinder, one of said arms being engageable by a movable part of the motor to oscillate it, and a spring connecting the offset ends of said arms whereby said second arm will be oscillated and said valve shifted to a second position.

4. Valve actuating mechanism comprising a pair of arms mounted in a cylinder wall to oscillate on their own axes, a valve carried by one of said arms, said arms being extended within the cylinder in opposite directions and provided with offset ends extending transversely of the cylinder, one of said arms being engageable by a movable part of the motor to oscillate it, and a spring connecting the offset ends of said arms whereby said second arm will be oscillated and said valve shifted to a second position, said spring being arranged in an inclined position to exert an inward pull on one of said arms and an outward pull on the other arm.

5. A device constructed in accordance with claim 2 wherein said spring is arranged at an angle to exert a pull on said arms and retain said valve on its seat.

6. In a fluid pressure motor for windshield cleaners, a casing having an exteriorly arranged valve seat, a piston therein, fluid passages opening through the valve seat and communicating with the casing, and valve mechanism for operatively controlling the admission of fluid pressure into said casing for operating the motor, said valve mechanism comprising an exteriorly arranged valve movable over said valve seat, an arm journalled in said casing and having its outer end bent laterally to engage and move said valve and its inner end bent laterally within said casing, a second arm journalled in said casing and having its inner end bent laterally, and a spring connecting the inner ends of said arms for snappingly moving one arm by and during movement of companion arm, said companion arm being movable from a movable part of the motor.

In testimony whereof, we affix our signatures.

FREDERICK G. FOLBERTH.
WILLIAM M. FOLBERTH.